United States Patent [19]
Pasch

[11] 3,850,555
[45] Nov. 26, 1974

[54] SEGMENTAL MOLD
[75] Inventor: Lambert Pasch, Nutheim, Germany
[73] Assignee: Uniroyal AG, Auchen, Germany
[22] Filed: Mar. 23, 1973
[21] Appl. No.: 344,186

[30] Foreign Application Priority Data
Apr. 17, 1972 Germany............................ 2218562

[52] U.S. Cl..................................... 425/46, 425/46
[51] Int. Cl............................ B29h 5/02, B29h 5/08
[58] Field of Search................................ 425/46, 47

[56] References Cited
UNITED STATES PATENTS

| 3,082,480 | 3/1963 | Balle | 425/46 |
| 3,396,221 | 8/1968 | Balle et al. | 425/43 X |
| 3,460,197 | 8/1969 | Cantarutti et al. | 425/46 |
| 3,461,502 | 8/1969 | Turk et al. | 425/29 |
| 3,464,090 | 9/1969 | Cantarutti | 425/46 X |
| 3,779,677 | 12/1973 | Greenwood | 425/46 |

FOREIGN PATENTS OR APPLICATIONS

| 1,239,461 | 4/1967 | Germany | 425/44 |
| 1,109,465 | 4/1968 | Great Britain | 44/425 |

*Primary Examiner*—J. Howard Flint, Jr.
*Attorney, Agent, or Firm*—Philip Sands, Esq.

[57] ABSTRACT

A segmental mold comprising a pair of side-wall-shaping members coaxially confronting one another and supported such that at least one is movable axially relative to the other, and an annular array of tread-shaping segments concentrically interposed between the members and supported for movement axially in parallel relation and radially from an open annular array whereing the segments are spaced from one another to a closed annular array of reduced extent, wherein the segments abut one another. The segments are commonly associated with one of the members through the intermediary of loosely associated mutually interfitting portions to as to effect a reduction in sliding friction therebetween. The segments are also associated with respective cams provided on the other of the members, the cams acting to assist in initiating radial movement of the segments.

14 Claims, 6 Drawing Figures

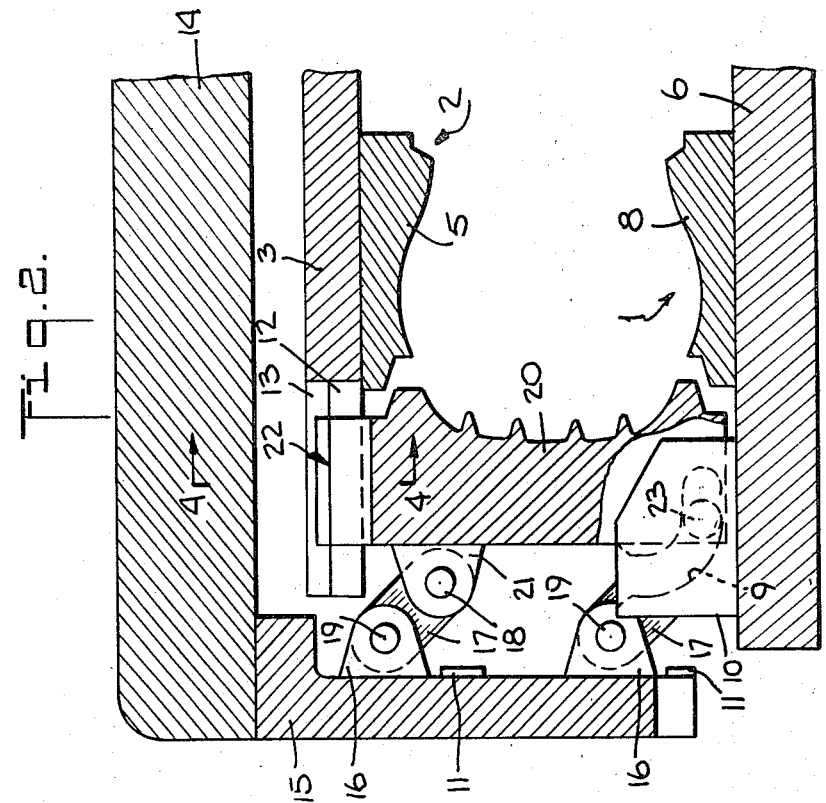
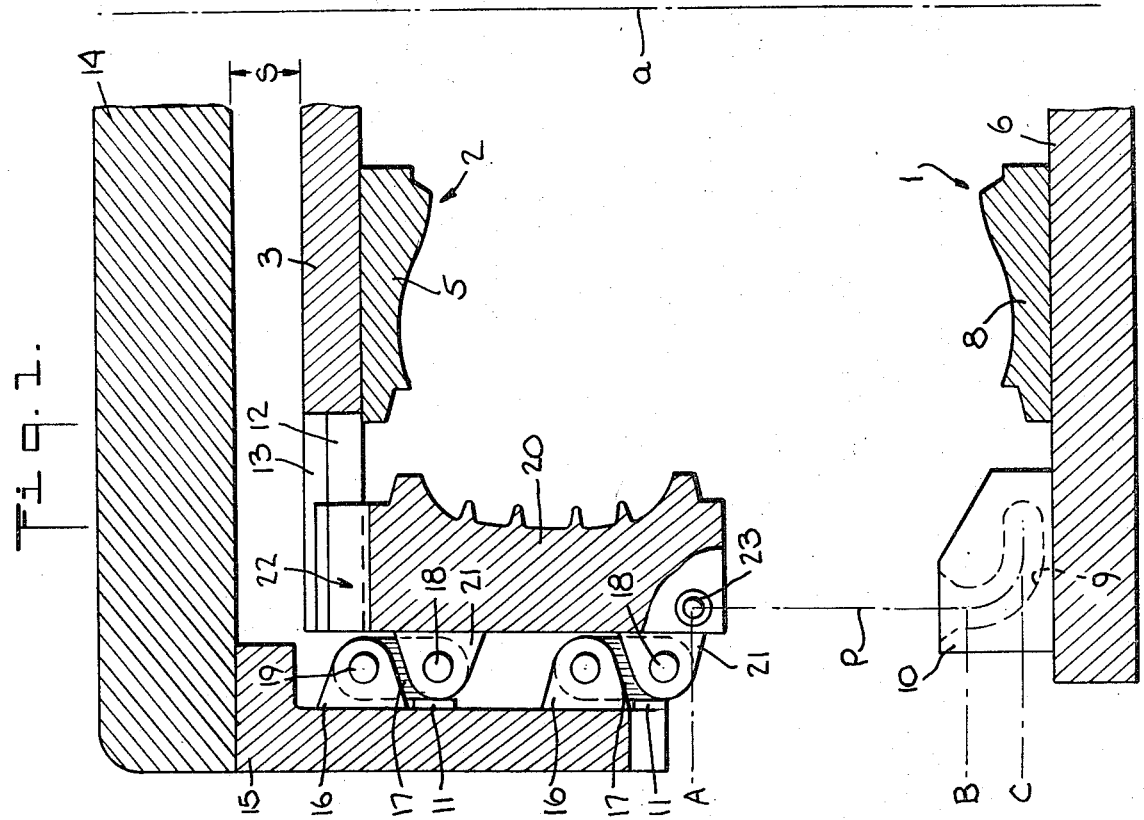

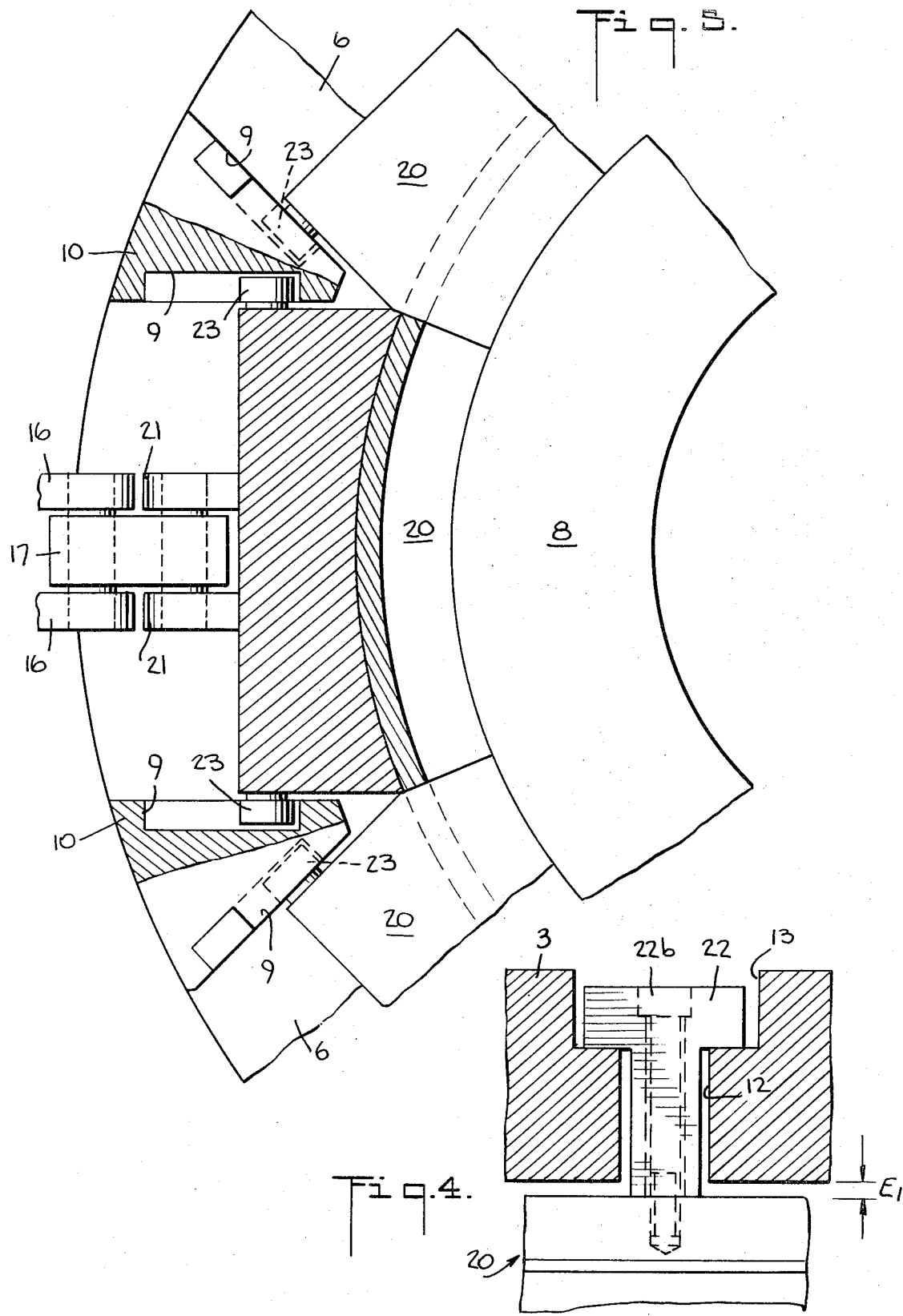

SEGMENTAL MOLD

BACKGROUND OF THE INVENTION

The present invention relates generally to tire curing presses, and more particularly to tire curing presses of the segmental mold variety.

Segmental molds in general are well known and usually comprise a pair of tire sidewall-shaping members between which is interposed an annular array of tire tread-shaping segments. The segments are movable radially from an open annular array wherein they are spaced from one another to a closed annular array of reduced extent wherein they abut one another. The sidewall-shaping members are movable axially toward and away from one another and often can be tilted to permit the insertion of an uncured tire carcass, or raw tire, therebetween. Presses of this nature employ an inflatable bladder for at least partially inflating the raw tire during the last stage of movement of the tread-shaping segments radially into a closed annular array, and thereafter for fully inflating the raw tire when the mold is in a completely closed condition to permit curing and vulcanization of the carcass.

It is a conventional expedient to provide the aforementioned presses with means for effecting radial displacement of the tread-shaping segments from an open annular array to a closed annular array of reduced extent as the sidewall-shaping members are axially moved into increasing proximity with one another and into opposing axial engagement with the tread-shaping segments. The means for achieving such an effect usually comprise various camming assemblies formed in one or the other of the sidewall-shaping members, and follower members slidably associated with the camming assemblies and connected to the tread-shaping segments, respectively.

One disadvantage associated with this arrangement is that the tread-shaping segments may reach their final radially inward position prior to the sidewall-shaping members reaching their final position in axially abutting association with the segments. Since the carcass is usually at least partially inflated during the aforementioned movement of the tread-shaping segments, the segments may be moved in various directions relative to one another and not remain commonly constrained against substantial non-uniform movement as the sidewall-shaping members are finally moved into abutting relation therewith. As a result, the tread-shaping segments may not impart a precise tread-groove impression into the partially inflated, uncured, carcass, thereby jeopardizing the quality of the tire.

On the other hand, the sidewall-shaping members may be moved into their final axially confronting position with one another prior to the movement of the tread-shaping segments into their final radially inward position. This necessitates the requirement to overcome sliding friction between the tread-shaping segments and the sidewall-shaping members. As a result, lubrication of the surfaces which slide relative to one another is often necessary. However, because of the juxtaposition and general inaccessibility of the sliding surfaces, the latter are difficult to properly lubricate. Failure to effectively lubricate these surfaces may result in the rapid wear of the parts which slide relative to one another and in undesirable non-uniform high temperatures during the initial inflation of the uncured tire carcass. Moreover, excessive force may be necessary for purposes of overcoming the sliding friction, this necessitating the use of expensive and complex equipment.

Another disadvantage associated with conventional segmental molds is that they cannot with simplicity and effectiveness maintain an initial requisite degree of axial spacing between the upper sidewall-shaping member and the movable platen or support therefor. In this respect, the platen is often provided with a cam surface for effecting radial movement of the segments, and is movable relative to the sidewall-shaping member and the segments. Since the raw tire is usually at least partially inflated during closing of the mold, axial forces are generated against the sidewall-shaping members which tend to cause the upper sidewall-shaping member to approach the cam-presenting platen. Such movement is undesirable during the initial stages of closing of the mold since it may result in too early of a radial shifting of the segments. It is overcome conventionally by the interposition of springs or power cylinders between the platen and upper sidewall-shaping member. Such an arrangement of necessity requires additional space, is unnecessarily complex, and is dependent upon the initial inflation pressure.

SUMMARY OF THE INVENTION

Accordingly, it is an object of the present invention to provide a segmental mold in which the sidewall-shaping members and tread-shaping segments are movable in sliding relation with one another, yet in a manner which greatly reduces the friction generated by the portions which slide relative to one another.

It is another object of the present invention to provide means for permitting movement of the sidewall-shaping members and tread-shaping segments relative to one another into the formation of a tightly sealed mold cavity in such a manner that excessive radially directed forces need not be generated against the tread-shaping segments.

It is still another object of the present invention to provide means for reliably maintaining an initial requisite degree of axial spacing between the upper press platen and upper sidewall-shaping member without interpositioning therebetween additional springs or power cylinders, and in a manner which is independent of the initial inflation pressure.

To this end, the present invention relates to a segmental mold having a pair of axially confronting sidewall-shaping members, and an annular array of tread-shaping segments interpositioned between the sidewall-shaping members. The tread-shaping segments are slidingly connected loosely to one of the sidewall-shaping members in such a manner that, during radial movement of the segments into a closed annular array, the segments may be moved slightly axially relative to at least the sidewall-shaping member to which they are commonly connected, thereby reducing the extent of sliding friction therebetween. The segments are also associated with respective cams provided on the other of the members, the cams acting to assist in initiating radial movement of the segments from an at-rest axially locked condition.

BRIEF DESCRIPTION OF THE DRAWINGS

The above and additional objects and advantages of this invention will be more clearly understood from the following detailed description thereof when read in conjunction with the accompanying drawings, in which:

FIG. 1 is a fragmentary, vertical or axially taken, cross-sectional view of the segmental mold of the present invention in an open condition;

FIG. 2 is a view similar to FIG. 1, wherein the mold is in a partially closed condition;

FIG. 4 is an enlarged, fragmentary, partial cross-sectional view taken along the line 4—4 in FIG. 2, and illustrates the upper portion of the typical segment and an open-headed, T-shaped slot in the upper sidewall-shaping member in and along which the upper portion of the typical segment slides;

FIG. 5 is an enlarged, fragmentary, partial cross-sectional view taken along the line 5—5 in FIG. 3.

DETAILED DESCRIPTION OF THE INVENTION

Figure 3:
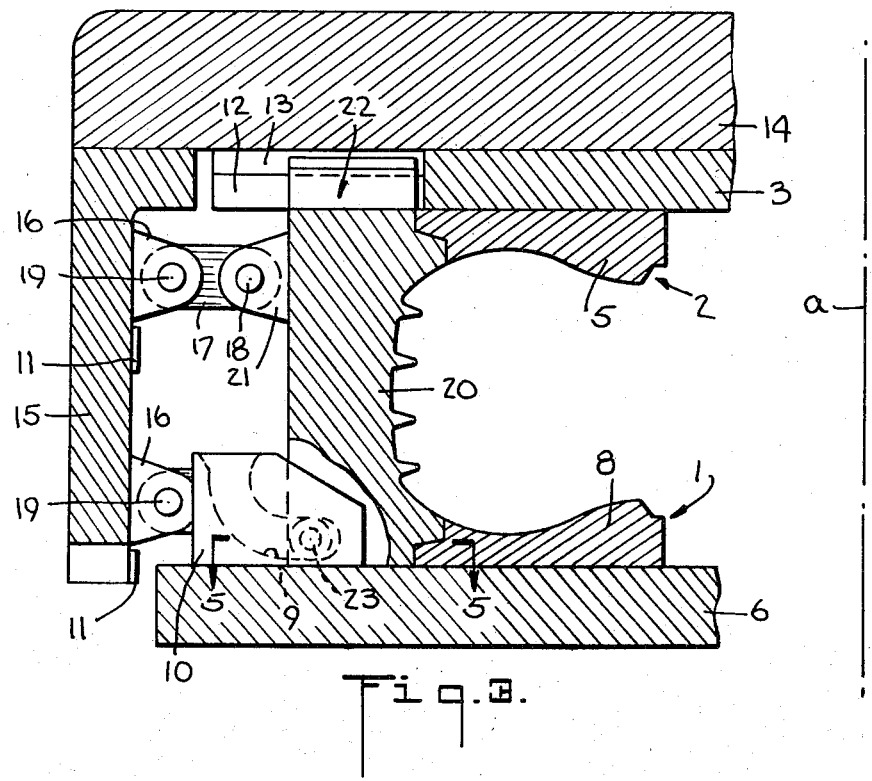
FIG. 3 is a view similar to FIG. 2, wherein the mold is in a fully closed condition.

Referring now to the drawings, and more particularly to FIGS. 1-3, the present invention relates to a segmental mold having a lower mold assembly 1, and an upper mold assembly 2. Interposed between the upper and lower assemblies is an annular array of tread-shaping segments, only a typical one of which is shown at 20. In the preferred embodiment, the lower assembly 1 is stationary and supported by conventional means (not shown). On the other hand, the upper mold assembly 2 is operatively associated with an upper platen 14 which can be moved by conventional means (not shown) axially toward and away from the stationary lower mold assembly 1.

The platen 14 is provided with an axially extending annular-like member, or skirt, 15 which extends downwardly toward the lower mold assembly 1 and surrounds the tread-shaping segments 20. Respective pairs of links 17 are provided for interconnecting the tread-shaping segments 20 to the skirt 15. Each of the links 17 is secured at one end by pins 18 to respective brackets 21 of the segments 20, and at the other end by pins 19 to respective brackets 16 which extend inwardly of the skirt 15. The segments 20, their respective pairs of links 17 and the skirt 15 define what may be characterized as a quadradic linkage. Thus, the links 17 of each pair always remain parallel to one another to effect movement of the segment 20 secured thereto both axially and radially of the assembly.

The upper mold portion 2 comprises a circular or disc-shaped plate 3 to the underside of which is secured an annular tire sidewall-shaping member 5 having a profile which corresponds to the sidewall of a pneumatic tire. Coaxially confronting the sidewall-shaping member 5 and fixedly secured to a disc-shaped plate 6 of the lower mold assembly 1, is a second tire sidewall-shaping member 8 of annular extent which likewise is provided with a profile corresponding to the opposite sidewall of a pneumatic tire.

As best illustrated in FIG. 4, the upper portion of each of the segments 20 is provided with a coupling member 22 which is generally T-shaped in cross-section as viewed radially of the assembly. Each coupling member 22 is secured to a respective one of the segments 20 such as by means of respective screws 22b. Moreover, the upper plate 3 is provided with a circumferential array of equi-distantly spaced, radially extending, T-shaped slots or rabbets in which are constrained, respectively, the coupling members 22 of the segments 20. Each of the T-shaped slots in the upper plate 3 is comprised of an upper wide portion 13 and a lower narrow portion 12.

The upper wide portion 13 of the slots in the plate 3, is substantially wider than the head portion of the T-shaped coupling member 22 associated therewith. Moreover, the narrow portion 12 of each of the slots in the plate 3 is substantially wider than the body portion of the coupling member 22 associated therewith. Thus, the T-shaped coupling members 22 are slidingly associated with the T-shaped slots in the plate 3 in a substantially friction-free manner, there being a substantial clearance between the plate 3 and the upper portion of each of the segments 20 as denoted by the distance $E_1$ in FIG. 4.

The lower portion of each of the segments 20 is provided with a pair of rollers 23 (FIG. 5) which are arranged so as to follow the broken path line 'P' (FIG. 1) and be insertable into respective ones of a pair of cam slots 9 presented by brackets 10 mounted on the lower plate 6. The cam slots 9 are open at their upper end portions to permit their initial reception of the rollers 23. In this respect, the links 17 are arranged to assume an at-rest vertical attitude parallel to the mold axis 'a' and abut against respective stop members 11 (FIG. 1) when the mold is in a fully open condition. This results in the self-alignment of the rollers 23 with the open ended portions of the cam slots 9 and in a self-locking of the links 17 for preventing the segments 20 and, thereby the upper sidewall-shaping member 5 from being moved axially relative to the upper platen 14. Locking of the links 17 and, thereby, the segments 20 permits precise centering of a raw tire without the encumbrance of radial movement of the segments 20.

In operation, as illustrated in FIG. 1, the mold is in an open condition, wherein the upper mold assembly 2 is in an elevated position (position 'A') relative to the lower mold assembly 1. In this position, an uncured tire carcass (raw tire) may be inserted therebetween. The platen 14 and upper mold assembly 2 then descend (by conventional means not shown) toward the lower mold assembly 1 to the position 'B' wherein the rollers 23 of the segments 20 initially project into the upper open ended portions of their associated can slots 9 presented by the brackets 10 of the lower plate 6. Since the links 17 are vertically oriented parallel to the mold axis 'a' and abut against their respective stop members 11, initial inflation of the raw tire at this time will not cause the spacing 'S' between the platen 14 and upper platen 3 to be reduced. Thus, the links 17 when in a vertical attitude act as dead-center locking means for ensuring that the platen 14 and plate 3 are not moved too early relative to one another.

Further descent of the upper mold assembly 2 to a level between levels 'B' and 'C' (FIG. 1) results in the radial movement of the segments 20 inwardly towards one another. In this respect, the upper arcuate portion of the cam slots 9 guides the respective rollers 23 downwardly and radially inwardly and, thereby, initiates unlocking of the links 17 out of their respective dead-center positions. This causes the links 17 to pivot about their support pins 19. When the upper mold assembly 2 reaches level 'C' (FIG. 1), the segments 20 define with one another an open annular array wherein they are slightly spaced from one another. Further descent of the platen 14, and further inward radial movement of the segments 20, as effected by the links 17 and the cam slots 9, results in a reduction of the axial spacing between the upper plate 3 and the underside of the platen 14 from substantially the spacing illustrated in FIGS. 1 and 2 to virtually zero as illustrated in FIG. 3. Thus, as the upper platen 14 descends toward the lower stationary plate 6, and eventually engages the upper plate 3, the links 17 are moved from the respective positions illustrated in FIGS. 1 and 2 to a horizontal attitude illustrated in FIG. 3. Such movement of the links 17 causes the segments 20 to move both axially relative to the upper platen 14 and radially inwardly of the mold. Inward radial movement of the segments 20 results in the formation thereof of a closed annular array of reduced extent wherein each of the segments abut one another and are axially abutted by the upper and lower sidewall-shaping members 5 and 8. In the closed position, the segments 20 and the upper and lower sidewall-shaping segments 5 and 8 define a tightly sealed mold cavity in which the predisposed uncured tire carcass can be properly cured.

It should be understood, that as the rollers 23 are guided in their respective cam slots 9, and as the links 17 are pivoted about their respective support pins 19, the upper T-shaped coupling members 22 of the segments 20 slide along the portions 12 and 13 of the radially directed T-shaped passageways presented by the upper plate 3. Since the cross-sectional extent of the T-shaped passageways is substantially greater than that of the T-shaped coupling members 22, the sliding movement of one relative to the other is substantially friction-free. Thus, the necessity for excessive radially directed forces to effect radial closing of the mold is obviated, the mold of the present invention having a capacity to be tightly and rigidly closed by an arrangement of simplicity and reliability.

Once the tire has been cured and vulcanized, the mold may be opened by a reversing of the sequence illustrated in FIGS. 1-3. The segments 20 and the links 17 will self-restore themselves, gravitationally, to their respective at-rest, dead-center, locked positions illustrated in FIG. 1 as the platen 14 is mechanically elevated. The cured tire may then be removed to permit recycling of the mold.

Figure 6:
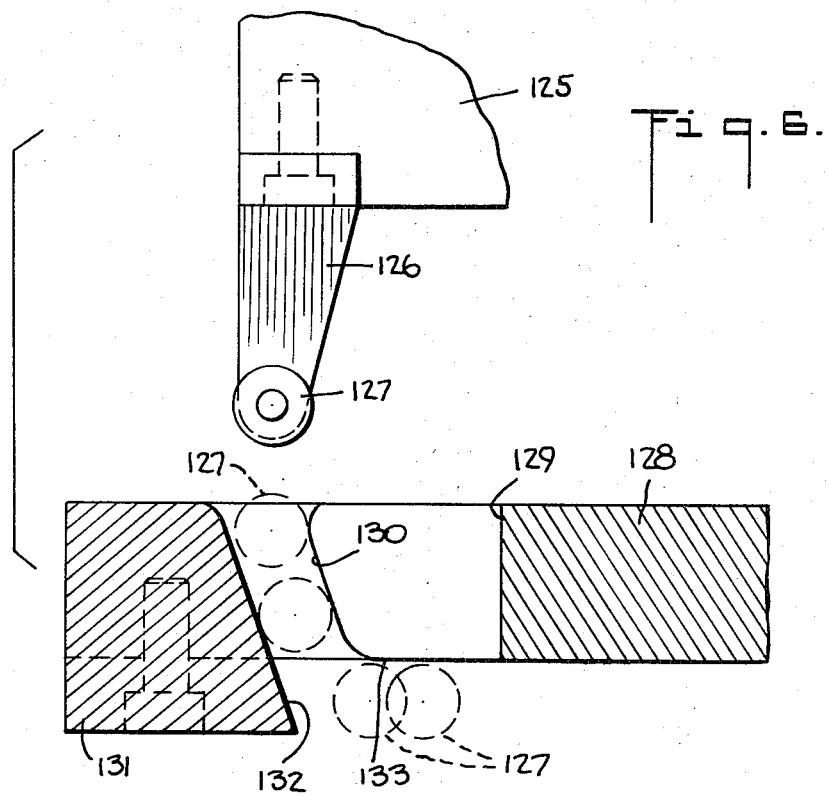
FIG. 6 is an enlarged, fragmentary, vertical cross-sectional view of an alternate embodiment of a portion of the present invention.

An alternate embodiment of the means for initiating movement of the segments radially or the links out of their respective at-rest, dead-center positions is illustrated in FIG. 6. In this respect, the segments, which are denoted hereinafter by the reference character 125, are each provided with a lower bracket arm 126 carrying a freely journaled idler roller 127 at its free end. The lower sidewall-shaping member 128 (or the support plate therefor) is provided with a circumferential array of slots. Each of the slots is provided with a first portion 129 for receiving a respective bracket arm 126 and a second portion 130 for receiving a respective roller 127.

Each slot portion 130 is defined in part by an inclined wall 132 which acts as a cam surface for being engaged by, and directing radial movement of, a respective roller 127. The extent of the wall 132 is increased by means of lowermost auxiliary plate 131 and, thus, the wall 132 extends below the lower surface 133 of the member 128.

Accordingly, in operation, as the segments 125 are moved axially into increasing proximity with the lower sidewall-shaping member or plate 128, the rollers 127 engage the respective walls 132 of the slot portions 130, and the arms 126 project into the respective slot positions 129. The walls 132 guide the rollers 127 radially inwardly, thereby, causing the links (such as the links 17 of the embodiment of FIGS. 1-5), which pivotally support the segments 125, to be forced out of their respective at-rest, dead-center positions (unlocked). This permits the segments 125 as well as the upper sidewall-shaping member (not shown) to be moved axially relative to the support platen (not shown) therefor. Axial movement of the segments 125 relative to the upper platen results in a corresponding radial movement of the segments 125 into a closed annular array.

Radial movement of the segments 125 is first effected by the walls 132, however, when the rollers 125 reach the portion of the walls 132 which is part of the auxiliary plate 131, the links effect further radial movement of the segments 125 such that the latter roll along the underside 133 of the support plate 128 until the segments 125 abut one another and present a closed annular array. In this condition, the segments 125 are axially abutted by the upper and lower sidewall-shaping members and, therefore, likewise present a closed mold cavity in which a predisposed raw tire may be cured and vulcanized. It should be understood, that the upper portion of the segments 125 is identical to that of the embodiment illustrated in FIGS. 1-5, and accordingly cooperates with the upper sidewall-shaping member in a manner described above for that embodiment.

Numerous alterations of the structure herein disclosed will suggest themselves to those skilled in the art. However, it is to be understood that the present disclosure relates to preferred embodiments of the invention which are for purposes of illustration only and not to be construed as a limitation of the invention.

What is claimed is:

1. A segmental mold comprising: an upper and a lower annular sidewall-shaping member coaxially confronting one another; carrier means for effecting movement of at least one of said members axially relative to the other of said members; an annular array of tread-shaping segments concentrically interposed between said members; linkage means for effecting movement of said segments both axially in parallel relation and radially from an open annular array wherein said segments are spaced from one another to a closed annular array of reduced extent wherein said segments abut one another and define a tire-curing mold cavity, said linkage means pivotally interconnecting respective ones of said segments to said carrier means and having a vertical at-rest locked position in parallel alignment with a common axis of said segments, said linkage means when in said vertically locked position preventing said segments from being moved axially relative to said carrier means and radially into a closed annular array; linkage unlocking means secured to said lower member and operatively associated with a lower end of each said segment for initiating movement of said linkage means out of their respective locked positions to, thereby, permit movement of said segments into a closed annular array, said linkage unlocking means including releasable means operatively associated with the lower end of each of said segments for restraining said segments against axial movement relative to one another and relative to said lower member when said carrier means and thereby said upper member are initially raised relative to said lower member and for (b) thereafter releasing said segments from said lower member entirely upon further elevation of said carrier means and thereby said upper member relative to said lower member to permit a complete opening of the mold; and coupling means for interconnecting said segments to said upper member, said coupling means comprising portions of said segments which interfit with corresponding portions of said upper member, said interfitting portions being slidable horizontally relative to one another during movement of said segments radially from an open annular array to a closed annular array 2. A segmental mold as claimed in claim 1 wherein said interfitting portions are loosely associated mutually with one another such that said segments and said upper member are movable slightly axially relative to one another during movement of said segments into and out of a closed annular array.

3. A segmental mold as claimed in claim 2, wherein said segments, when in said closed annular array, are opposingly engaged axially by said members and are thereby restrained against said slight axial movement relative to said upper member.

4. A segmental mold as claimed in claim 2, wherein said interfitting portions of said segments with said upper member comprise a radial array of guide means extending relative to said upper member and respective follower means loosely associated slidably with said guide means and extending from said segments.

5. A segmental mold as claimed in claim 4, wherein said guide means comprise radially directed passageways extending from said first member, said follower means each having a cross-sectional contour complementing the cross-sectional contour of corresponding ones of said passageways but of substantially lesser dimension than the latter such that there is presented a friction-reducing clearance therebetween.

6. A segmental mold as claimed in claim 5, wherein said passageways and said follower means are each substantially T-shaped in cross-section.

7. A segmental mold as claimed in claim 1 wherein said releasable means includes a plurality of cam members secured to said lower sidewall-shaping member, each of said segments including at least one follower member engageable with a respective one of said cam members when said upper sidewall-shaping member is moved axially into proximity with said lower sidewall-shaping member.

8. A segmental mold as claimed in claim 7 wherein each of said cam members includes a guide slot along which a corresponding one of said follower members is movable.

9. A segmental mold as claimed in claim 8 wherein each said guide slot includes an upper open end portion into and out of which a corresponding one of said follower members is movable, said linkage means when in said locked position maintaining said segments such that said follower members are aligned vertically above said upper open end portions of said guide slots, respectively.

10. A segmental mold as claimed in claim 9 wherein each of said cam members includes a bracket mounted upon the upper portion of a plate fixedly supporting said lower sidewall-shaping member, said guide slots being formed in said brackets, respectively.

11. A segmental mold as claimed in claim 9 wherein each of said follower members includes an idler roller complemental in size to its corresponding guide slot.

12. A segmental mold as claimed in claim 11 wherein each of said guide slots is provided with a first portion and a second portion which radially communicate with one another, each of said follower members including an arm extending downwardly below the respective segment to which it is affixed and which carries at a lowermost free end thereof a respective one of said rollers, each of said first portions of said guide slots being adapted for receiving a respective one of said arms, each of said second portions of said guide slots being adapted for receiving a respective one of said rollers.

13. A segmental mold as claimed in claim 12 wherein each of said guide slots is formed in a plate which fixedly supports said lower sidewall-shaping member, said guide slots including an inclined cam surface which extends below the underside of the latter said plate.

14. A segmental mold as claimed in claim 1, wherein each of said segments is operatively associated with its corresponding linkage means and said carrier means in the form of a quadratic linkage.

* * * * *